(12) United States Patent
Linzbach et al.

(10) Patent No.: US 12,482,282 B2
(45) Date of Patent: Nov. 25, 2025

(54) SYSTEM FOR DETERMINING THE EFFECT OF ACTIVE INGREDIENTS ON ACARIFORMES, INSECTS AND OTHER ORGANISMS IN AN ASSAY PLATE CONTAINING WELLS

(71) Applicant: Bayer Aktiengesellschaft, Leverkusen (DE)

(72) Inventors: Johannes Linzbach, Cologne (DE); Barthel Bach-Zelewski, Remscheid (DE); Klaus Ochmann, Leverkusen (DE); Franco Fois, Monheim (DE); Kerstin Ilg, Cologne (DE); Angelika Köllen, Cologne (DE)

(73) Assignee: Bayer Aktiengesellschaft (DE)

( * ) Notice: Subject to any disclaimer, the term of this patent is extended or adjusted under 35 U.S.C. 154(b) by 338 days.

(21) Appl. No.: 17/615,502

(22) PCT Filed: May 27, 2020

(86) PCT No.: PCT/EP2020/064682
§ 371 (c)(1),
(2) Date: Nov. 30, 2021

(87) PCT Pub. No.: WO2020/244990
PCT Pub. Date: Dec. 10, 2020

(65) Prior Publication Data
US 2022/0318575 A1  Oct. 6, 2022

(30) Foreign Application Priority Data
Jun. 3, 2019  (EP) .................................... 19177911

(51) Int. Cl.
*G06V 20/69*  (2022.01)
*G06F 18/2413*  (2023.01)
*G06V 10/82*  (2022.01)

(52) U.S. Cl.
CPC ...... *G06V 20/698* (2022.01); *G06F 18/24143* (2023.01); *G06V 10/82* (2022.01)

(58) Field of Classification Search
CPC .... G06V 10/82; G06V 20/698; G06V 10/764; G06T 2207/10148
See application file for complete search history.

(56) References Cited

U.S. PATENT DOCUMENTS 11,900,600 B2 *  2/2024  Stamatoyannopoulos ................... G16B 40/20
2011/0169985 A1 *  7/2011  Cooper ................. G06T 3/4038
                                                                    348/241

(Continued)

FOREIGN PATENT DOCUMENTS

WO   2016172532 A2   10/2016

OTHER PUBLICATIONS

Gopakumar, Gopalakrishna Pillai, et al. "Convolutional neural network-based malaria diagnosis from focus stack of blood smear images acquired using custom-built slide scanner." Journal of biophotonics 11.3 (2018): e201700003. (Year: 2018).*

(Continued)

*Primary Examiner* — Michael Horabik
*Assistant Examiner* — Stefano Anthony Dardano
(74) *Attorney, Agent, or Firm* — Morrison & Foerster LLP (57) ABSTRACT

The invention relates to an automated system and a method for determining the effect of active ingredients on organisms such as insects, Acariformes and nematodes in an assay plate containing wells with the aid of image-acquisition and image-analysis technology. The invention allows the characterization of the population of the organisms at multiple time points.

9 Claims, 5 Drawing Sheets

(56) References Cited

U.S. PATENT DOCUMENTS

2011/0181622 A1* 7/2011 Bacus .................. G06T 3/00
                                                    345/634
2019/0384051 A1* 12/2019 Gaiduk .............. G02B 21/0048

OTHER PUBLICATIONS

Naro, Yuta, et al. "Small molecule inhibition of MicroRNA miR-21 rescues chemosensitivity of renal-cell carcinoma to topotecan." Journal of medicinal chemistry 61.14 (2018): 5900-5909. (Year: 2018).*

Patten, Tom, et al. "Automatic *Heliothis zea* classification using image analysis." 16th IEEE International Conference on Tools with Artificial Intelligence. IEEE, 2004. (Year: 2004).*

Vincent, Thomas R., et al. "Real-time in vivo recording of *Arabidopsis* calcium signals during insect feeding using a fluorescent biosensor." Journal of Visualized Experiments: JoVE 126 (2017): 56142. (Year: 2017).*

De Souza, M.R.Q., et al. (2018). "A Framework 1-16 for Automatic Recognition of Cell Damage on Microscopic Images using Artificial Neural Networks", 40th Annual International Conference of the IEEE Engineering in Medicine and Biology Society (EMBC), IEEE, 18: pp. 636-639.

Gopakumar, G.P. et al. (2018). "Convolutional neural network-based malaria diagnosis from focus stack of blood smear images acquired using custom-built slide scanner", Journal of Biophotonics, DOI: 10.1002/jbio.201700003: pp. 1-18.

He, K. et al. (2016). "Deep Residual Learning for Image Recognition," CVFR paper, http://openaccess.thecvf.com/content_cvpr_2016/papers/He_Deep_Residual_Learning_CVPR_2016_paper.pdf; 770-778.

International Search Report mailed Aug. 12, 2020 for PCT Application No. PCT/EP2020/064682, filed May 7, 2020, 6 pages.

Kurtulmus, F. et al. (2013) "Detection of 1-16 dead entomopathogenic nematodes in microscope images using computer vision", Biosystems Engineering, 118: 29-38.

Lin, T-Y et al (Feb. 7, 2018). "Focal Loss for Detection," Facebook AI Research, arXiv:1708.02002v2 [cs.CV], pp. 1-10.

Mallard, F. et al.. (2013). "An Automated 1-16 Image Analysis System to Measure and Count Organisms in Laboratory Microcosms", PLOS One, 8(5): e64387.

Patten, T. et al. (2004). "Automatic *Heliothis zea* Classification Using Image Analysis", G06K9/00 Tools With Artificial Intelligence, 2004. G06K9/62 ICTAI 2004. 16th IEEE International Conference on Boca Raton, FL, USA Nov. 15-17, 2004, Piscataway, NJ, USA, IEEE, Nov. 15, 2004 (Nov. 15, 2004), pp. 320-327.

Ren, S. et al. (2015). "Faster R-CNN: Towards Real-Time Object Detection with Region Proposal Networks," Advances in Neural Information Processing Systems (NIPS), Curran Associates, Inc., (arXiv:1506.01497v2 [cs.CV] Sep. 13, 2015): 1-10.

Ren, S. et al. (2016). "Faster R-CNN: Towards Real-Time Object Detection with Region Proposal Networks," IEEE International Conference on Computer Vision (ICCV) (arXiv:1506.01497v3 [cs.CV] Jan. 6, 2016): 1-14.

Effilux, (2024). "High power LED Lighting for machine vision," available on-line at <www.effilux.com>, 2 pages.

* cited by examiner

SYSTEM FOR DETERMINING THE EFFECT OF ACTIVE INGREDIENTS ON ACARIFORMES, INSECTS AND OTHER ORGANISMS IN AN ASSAY PLATE CONTAINING WELLS

CROSS REFERENCE TO RELATED APPLICATIONS

This application is a national stage application under 35 U.S.C. § 371 of International Application No. PCT/EP2020/064682, filed internationally on May 27, 2020, which claims the benefit of priority to European Application No. 19177911.5, filed Jun. 3, 2019.

TECHNOLOGICAL FIELD

This disclosure relates to a system and a method for determining the effect of active ingredients on organisms, such as insects, Acariformes and nematodes, in an assay plate containing wells.

BACKGROUND

Many species of insects, Acariformes and nematodes are pests in agriculture because they can severely impair plant metabolism through damage to plant organs, such as, for example, leaves. Examples of insects and Acariformes are Myzus persicae, Spodoptera frugiperda, Phaedon cochleariae, and spider mites such as Tetranychus urticae. To counter insect and Acariformes infestation, various chemical substances have already been developed, the so-called insecticides and acaricides, respectively. However, there is a great need to identify further active ingredients which can control the pests effectively.

Figure 1:
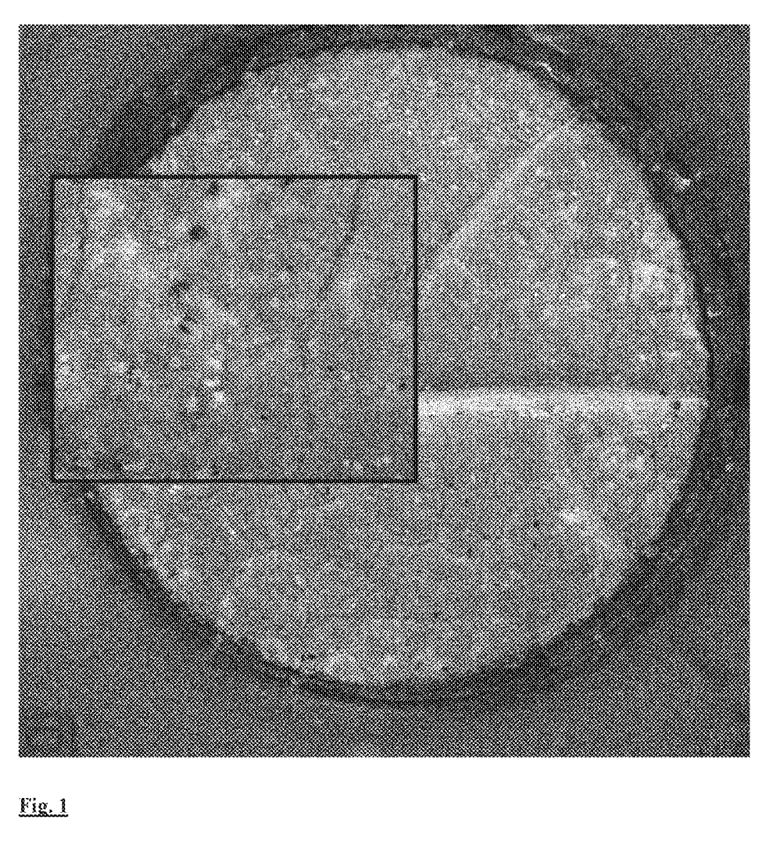
FIG. 1 shows spider mites on a leaf disk in a well.

The use of assay plates for such explorations is known. Typically, use is made of well standard plates (MTP), for example a 12-well MTP. The wells are, for example, filled with agar, and placed into each well is one leaf disk of a diameter appropriate for the well. Present on said leaf disks are, for example, Tetranychus urticae, also called spider mites. In relation to the size of an MTP of approx. 80 mm×110 mm, the objects to be detected are very small, approx. 0.2-0.6 mm. To illustrate this fact, an enlarged detail of a leaf (approx. 20 mm) in a well has been depicted in FIG. 1.

The task is to automatically capture and evaluate the assay plates with the aid of image acquisition and analysis technology before and after the application of an active ingredient.

Image acquisition is carried out by acquiring an image of the object, in this case the support, i.e., the leaf (piece), in the well on the camera sensor, on which the object appears just as large as the object itself; the imaging scale is then approximately 1, also described as 1:1. In the context of the disclosure, an entire well of the MTP is recorded per image.

Since a leaf disk does not lie absolutely flat in the well of the MTP and there is a very shallow depth of field, typically less than one millimeter, due to the imaging scale, many regions in an image are out of focus. Image analysis requires an in-focus image of an entire well. This is achieved through the use of a combination of continuous shooting of the well and an image processing algorithm, so-called "focus stacking". For this purpose, what is acquired is a sequence of images in which only the focusing or the shooting distance has been changed, with the result that the images differ essentially only in the focal plane. The method of focus stacking creates an image of the well on which the leaf is depicted completely in focus, which is evaluated.

During the evaluation, the individual organisms—especially spider mites, Acariformes, insects or nematodes—and ideally the corresponding stage of development should be identified. It should also be possible to distinguish between living and dead organisms. In other words, an automatic classification of the organisms should be made possible according to the following criteria: adults, larvae, eggs, N/A (not determinable) and, in addition, respective sub-differentiation: living, dead, N/A (not determinable).

Since living animals may move very quickly and a quick overall measurement is desired, a relatively short measurement time per well is desirable. Moreover, in order to allow high-throughput screening, the image acquisitions for a complete MTP (multititer plate) should not take more than 50 seconds.

It is therefore an object of the disclosure to provide a solution for determining the effect of active ingredients on living organisms, in particular insects, Acariformes and nematodes, in an assay plate containing wells. In particular, the solution according to the disclosure should be usable when the organisms are present on a non-flat support—such as, for example, on a leaf piece—or move in the well. The solution should allow a quick and reliable determination of the effect of the active ingredients and high-throughput screening of the effect of an active ingredient on living insects, Acariformes or nematodes.

SUMMARY

The object underlying the disclosure is achieved by a system for determining the effect of active ingredients on living organisms accommodated on a support in a well according to claim 1. Embodiments of the system can be found in the claims dependent on claim 1. The object underlying the disclosure is further achieved by the methods. Embodiments of the method can be found in the claims.

The apparatus according to the disclosure for acquiring macroscopic images of organisms accommodated on a support in at least one well comprises:
- a camera having an optical system, wherein the camera is arranged over the well and serves to acquire multiple macroscopic images having different focal planes from the well,
- a device for changing the focal plane,
- a device for illuminating the well with at least one light source, wherein the device for illumination illuminates the well homogeneously from above,
- a device for positioning the wells that is movable horizontally in the two directions x and y.

The focal plane is changeable by changing the focus of the optical system and/or the distance between the optical system and the cell culture plate.

The apparatus according to the disclosure can for acquiring macroscopic images of other objects having a complex three-dimensional structure, such as, for example, crystals, or objects at an unknown distance in relation to the camera, preferably accommodated on a mount.

Preferably, the devices for positioning the wells, the high-resolution camera and/or the device for changing the focal plane are controllable with the aid of a computer program. Particularly preferably, all these components of the apparatus are controllable.

The apparatus comprises a component for transmitting, storing and processing the images.

Preferably, the apparatus is part of a system comprising modules designed for operation of the respective elements of the apparatus for acquiring macroscopic images, the modules of the system being connected to the elements of the apparatus via interfaces.

Typically, one or more of the following modules are used for the operation of the respective elements of the apparatus for acquiring macroscopic images:
- a module designed for adjustment and operation of the device for changing the focal plane, also called the focal plane module, connected to the device for changing the focal plane,
- a module for image acquisition and camera control, also called the image acquisition module, connected to the camera and designed for acquisition of multiple images (series of images) having differing focal plane per well, and
- one or more database modules designed for storage of images, wherein one of the database modules is connected to the camera.

Preference is given to acquiring images of wells arranged in a cell culture plate (also generically called an arrangement of wells). In the wells off the cell culture plate, organisms and a support, such as, for example, a leaf piece, can be contacted with an active ingredient. Said cell culture plate has a bottom side, a top side and also side walls which extend between the bottom side and the top side. The different wells can be filled with different active ingredients and/or different organisms. There can also be wells in which only organisms without active ingredient are present. A person skilled in the art will plan and implement the structure of the relevant assay as required.

For efficient and unambiguous processing and evaluation of acquired images, each cell culture plate usually has a readable ID, such as, for example, a barcode, which can be read and is transmitted to a database together with the analysis results in a well- and cell culture plate-specific manner. Preference is given to storing the information about the assay, such as, for example, active ingredients, amount of active ingredient and organisms, likewise in a well- and cell culture plate-specific manner. For this purpose, the system has a database module or is connected to such a database.

Preferably, the system comprises a process module designed for coordination of image acquisition, so that, between two images of a series of images on a well, the focal plane is changed according to a predefined sequence and a series of images is acquired.

Typically, the series of images is stored in a database module in a well- and cell culture plate-specific manner.

At the end of the acquisition of the series of images for a well, a command is usually issued for positioning of the next well in relation to the camera. Preferably, said command is issued to the device for positioning the wells.

Preferably, the device for positioning the wells is movable horizontally in the directions x and y. Such a device is also called an X/Y table or cross table. The corresponding wells are arrived at by means of the adjustable X/Y table/cross table for the acquisition of a series of images. In some embodiments of the apparatus, a motorized scanning table is used.

Preferably, this device for positioning the wells is computer-controllable. For this purpose, the apparatus has a corresponding interface having a corresponding module—also called a well positioning module—which is configured for operation of the device for positioning the wells.

In some embodiments, the well positioning module is designed for:
- placement of a well in a predefined position in relation to the optical system (also called adjustment of the well) by horizontal movement of the cell culture plates with the aid of the device for mounting the cell culture plate,
- repetition for each well until all wells have been recorded, In some embodiments of the apparatus, the elements of the apparatus are accommodated in a housing. Preferably, the apparatus then comprises a UV lamp for cleaning the housing. Preferably, microbial elimination for positioning the wells is feedable into and withdrawable out of the housing. Preferably, the well positioning module is then designed for automatic feeding/withdrawal of the device for positioning the wells into/out of the housing.

The organisms are depicted by using a camera. Preferably, the camera comprises a sensor which allows a 1:1 imaging scale of a well on the sensor.

Preferably, a well having an inner diameter of 22 mm and a square sensor having a width of 23 mm or sensor surface of 5120×5120 pixels (25 MPix) are used in order to obtain an optimal image.

Typically, color images are acquired, preferably in the visible spectrum.

Since the animals move quickly and therefore a relatively short measurement time is required, what was selected was the Allied Vision Bonito Pro camera and CoaxExpress interface between the camera and a control device; with this combination, images can be acquired at up to 60 FPS (frames per second).

The optical system typically consists of a lens characterized by an imaging scale of, for example, 1:10 combined with a bellows or an intermediate ring in order to achieve an imaging scale of 1:1 or greater between the well and the sensor surface.

Since the supports usually do not lie flat in the well and there is a very shallow depth of field due to the imaging scale, aperture and working distance, many regions in the image are out of focus in the case of single frame acquisition. Image analysis requires an image of each well where the image is in focus everywhere. For this purpose, the series of images acquired by the camera is preferably processed. This is achieved through the use of a combination of continuous photographic shooting (series of images) and digital image processing technology, so-called "focus stacking"/focus variation. For this purpose, use is made of a sequence of images/series of images in which only the focusing or the shooting distance has been changed, with the result that the images differ essentially only in the focal plane. It is possible in this case to acquire a series of images of a complete well within a maximum of one second. For high-throughput screening, this is a distinct advantage compared to the prior art.

To date, said prior art involves respective acquisition of a series of images with focus variation (focus stacking) only from part of the well at an appropriate resolution (i.e., the number of pixels per organism) for identification of small objects and respective combination of many series of images (focus stacking images) for each well. This method has the disadvantage that the method requires a lot of time per well, that the images have to be aligned in relation to one another in a complicated manner, and that there is additionally the risk of a moving organism being recorded twice or not at all.

Changing the focal plane is achieved with the aid of the controllable element for changing the focal plane. Changing the focal plane can be achieved by focusing at the lens or by changing the distance between the camera and the object or between the lens and the object (in this case, the support) along the vertical axis (z-axis).

In some embodiments of the disclosure, the optical system consists of a fixed-focus lens and a bellows. In some embodiments, the focal plane is changed by adjusting the bellows. Preferably, the bellows is adjustable with the aid of a focal plane module via an interface, the focal plane module being designed for adjustment of the bellows. In some embodiments, the distance between the lens and the cell culture plate is typically defined by a fixed mounting of the camera in relation to the device for positioning the wells.

Figure 2:
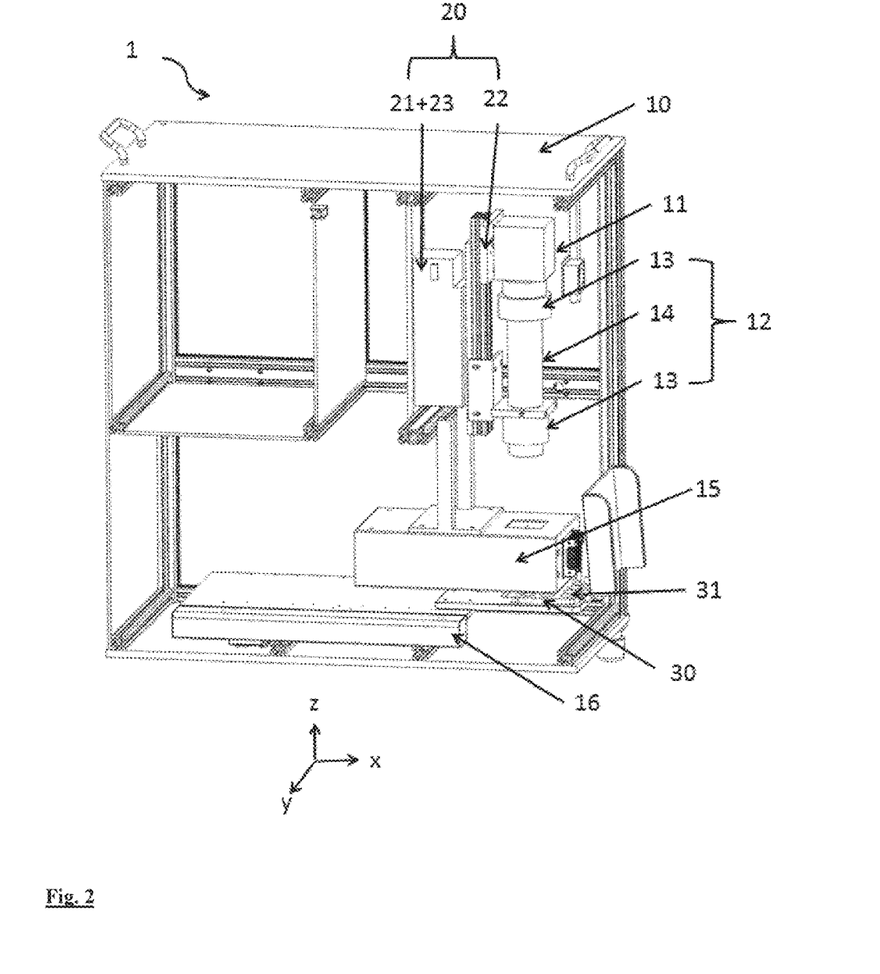
FIG. 2 shows schematically in cross section an exemplary embodiment of the apparatus according to the disclosure for acquiring macroscopic images.

In some embodiments of the disclosure, the optical system consists of a fixed-focus lens, for example one having an imaging scale of 1:10, and one or more intermediate rings (see FIG. 2). The configuration of the fixed-focus lens is preferably calculated such that an imaging scale of 1:1 between the sensor and a well is achieved. For example, what was used for the sensor described above and a well from a standard 12-well MTP was a QIOPTIQ INSPEC.X L 105/5,6-1,0X, a precision lens for image circles up to 82 mm, optimized for the desired magnification by assembly with a lens barrel of approx. 120 mm. In some embodiments, the focal plane is usually set once and no longer changed. The focal plane is changed by changing the shooting distance, defined by the distance between the object and the lens. This change can be achieved by moving the camera or the well along the vertical axis (also called the z-axis). Preferably, the camera is mounted on a device for moving the camera that allows precise movement of the camera along the vertical axis. For example, the camera is precisely adjustable and movable with the aid of a motorized z-axis. Preferably, said device is controllable for precise adjustment and movement.

Preferably, the device for moving the camera has an interface with a focal plane module, said module being configured for setting and changing of the focal plane.

In some embodiments of the disclosure, the focal plane module is designed for:
  adjustment of the camera or setting of the focal plane by positioning the camera along the vertical axis (z-direction),
  calculation/setting of the distance between the focal planes of two images in a series of images, and
  movement of the camera according to the predefined distance to change the focal planes.

Movement of the camera for image acquisition with respect to a well is also called travel of the camera.

Typically, the process module controls image acquisition for each well. Usually, up to 50 individual images are captured in quick succession and in different focal planes from each well during travel of the camera. The typical distance between the focal planes of two images is 0.25 mm.

The design of the optical system means that it has low light intensity, which necessitates very bright illumination. Preferably, a light output of 250 W to 350 W is required. In order to meet this requirement, preference is given to using an element for coaxial illumination that comprises a light source and a semitransparent mirror mounted for coaxial illumination. The light intensity was achieved with the aid of an LED array as the light source. For example, a light source composed of 16 white high-power LEDs was used, which achieves a light output of approximately 300 W (flashed). In order to obtain homogeneous and bright illumination, the element for coaxial illumination preferably has a diffuser between the light source and the mirror. It may be advantageous to cool the light source; for example, this is achieved with the aid of an element for passive cooling. The principle of coaxial illumination is known to a person skilled in the art and is, for example, described on http://www.effilux.fr.

The element for coaxial illumination is preferably designed as flash lighting with short and very bright flashes in order to capture images in quick succession during the movement of the camera/lens combination and of the animals. For this purpose, the light source is preferably operated in flash mode; for this purpose, the illumination module is typically connected to the camera. Using the light source described above, a flash time of 40 µs-1500 µs can be achieved. Typically, the control device is configured for control of the illumination device in flash mode.

Typically, the element for coaxial illumination is dimensioned such that it homogeneously illuminates the entire assay plate or at least the well placed under the camera. Preferably, the element for coaxial illumination is dimensioned in order to illuminate approximately 120% of the area of the well to be recorded.

Typically, an assay plate has a fixed number X of wells arranged in a row, with a number Y of rows arranged next to one another yielding altogether X by Y individual wells. For the solution according to the disclosure, cell culture plates having a total number of 30 wells (3×4 grid) are preferred; alternatively, 4×6 or 6×8 or 8×12 grids are likewise usable.

The method for determining the effect of active ingredients on organisms, such as insects, Acariformes and nematodes, in an assay plate containing wells envisages first filling at least one well of the cell culture plate with a leaf on agar, living organisms and an active ingredient. The cell culture plate is then placed into an apparatus according to the above remarks.

Image acquisition is effected by the method for image acquisition by performance of the following steps:
  a) placement of a well or an arrangement of wells in the device for positioning the wells in a predefined position in relation to the camera by horizontal movement of the well or the arrangement of wells with the aid of the device for positioning the wells,
  b) setting of a focal plane by operation of the device for changing the focal plane,
  c) image acquisition by means of the camera,
  d) storage of the image in a database module,
  e) changing of the focal plane by operation of the device for changing the focal plane,
  f) repetition of steps c) to e) for acquisition of a predefined number of images in a series of images,
  g) repetition of steps a) to f) for the next well until all wells have been recorded.

In some embodiments, the series of images is processed using the focus stacking method into an image that is in focus everywhere as far as possible, i.e., an image of increased depth of field.

Preferably, the system according to the disclosure comprises a module designed for processing of a series of macroscopic images using the focus stacking method—also called the image processing module. The system according to the disclosure is designed such that provision of a series of images from a database module, performance of the stacking method in the image processing module and storage of the image of increased depth of field generated using the stacking method in a database module can take place.

Image processing using the focus stacking method typically comprises the following steps:
  a series of images is provided to the module for image processing,
  an analysis of image focus is carried out for each image, from different images, the regions most in focus in each case are then cut out, since changing the focus can result in a change in the imaging scale and objects in the image can shift slightly, an image transformation is carried out prior to the actual assembly of the individual images for the best possible overlay of the images, the regions of the images that are most in focus in each case are subsequently joined together to form one image having an increased depth of field.

Using this method, at least one image of increased depth of field is provided per well.

Typically, the image that is in focus everywhere is stored in a database module and/or is transferred to a module configured for image analysis (also called the image analysis module).

It is obvious to a person skilled in the art that the selection and design of the modules of the system can be adapted to the controllable devices of the apparatuses according to the disclosure for acquiring macroscopic images; the accommodation of the image processing module and image analysis module is also designable as desired according to requirements.

What follow are the steps of automated analysis of a macroscopic image, preferably a macroscopic image that is in focus everywhere. If an image that is in focus everywhere is not present, the analysis can be carried out on the part of a macroscopic image that is in focus.

The analysis is carried out by a piece of image recognition software. The image recognition software is configured such that it examines the images for the presence of specific (characteristic) features. In the present disclosure, organisms on the support are identified by means of object recognition and classified according to predefined properties.

In some embodiments, the organisms are automatically classified according to the following criteria: adults, larvae, eggs, N/A (not determinable)—also called stage—and/or living, dead, N/A (not determinable)—also called status.

Typically, the position and size of the organisms in the image and their respective status and/or stage are determined and output.

For machine analysis of an image, use is made of a model containing a connection between image features and the abovementioned classification. For the analysis, use is made of one or more neural networks for image analysis that need to be trained.

Preferably, supervised learning is used for training the neural network(s). This means that a neural network receives annotated images (training images and validation images) on which all organisms have been annotated by means of expert knowledge and is trained therewith. The annotation involves assigning to each organism a position (also called object position), an object size and a stage and/or a status. Annotated images are typically prepared as follows: the expert marks the visually recognized organisms in the image via a user interface. For example, each organism is individually bordered with a RoI (region of interest, e.g., in the form of a rectangle/bounding box) and annotated with the desired classification (status and stage). This information can be saved together with the image file name in a text file. Stored in said text file are typically the position of the RoI and its size or the coordinates of the pixels assigned to an organism and the classification for each organism.

Preferably, object size is also collected and stored automatically. In a further step, the expert can be asked via a user interface to confirm each object as an organism and to annotate it accordingly.

If the organisms annotated as such are present, the expert can be asked to assign one or more predefined classifications to each annotated organism: (e.g., stage of development—adults, larvae, eggs or N/A (not determinable)—and/or a differentiation between living, dead or N/A).

A set of annotated images (input for training) is subsequently used to train the neural networks. In the set of images, use was made of, for example, approx. 16000 annotations.

Newly acquired images can then be analyzed with the aid of these trained algorithms (neural networks).

The above-described method, which is realized with special types of neural networks, is thus divided into object recognition (position and size) and object classification.

For the application of the method according to the disclosure for screening on small living organisms, preference is given to selecting neural networks for object detection having the necessary precision and speed.

For example, use has been made of region-based convolutional neural networks (also called R-CNN). In particular, use has been made of a Faster R-CNN, a solution consisting of two modules, as described for example by Ren et al. (Ren, Shaoqing; He, Kaiming; Girshick, Ross; Sun, Jian: Faster R-CNN: Towards Real-Time Object Detection with Region Proposal Networks. In: Advances in Neural Information Processing Systems (NIPS), Curran Associates, Inc., 2015, pages 91-99, https://arxiv.org/pdf/1506.01497.pdf). The first module is a deep fully convolutional network which proposes regions, also called a region proposal network (RPN). After the RPN, "RoI pooling" is carried out in order to obtain RoIs of a fixed size. In the second module, the results of the "RoI pooling" are classified with the aid of a Fast R-CNN detector (R. Girshick, "Fast R-CNN," in IEEE International Conference on Computer Vision (ICCV), 2015-DOI: 10.1109/ICCV.2015.169). For the training of the Faster R-CNN, the "4-step alternating" training method was selected as suggested by Ren et al.

More precisely, the Faster R-CNN algorithm involves first examining the image for potential objects; object recognition and determination of the position thereof is typically realized using a region proposal network (RPN), with each point in the image being assigned to an object (in this case, a suspected organism) or to the background or support. Preference is given to determining a probability of the presence of an object at a certain point in the image—also called a "score", which is subsequently filtered with the aid of an adjustable limit value. For example, use was made of a deep residual network having 101 layers (also called ResNet 101) as the RPN (Kaiming He, Xiangyu Zhang, Shaoqing Ren, Jian Sun, Deep Residual Learning for Image Recognition, CVPR paper—http://openaccess.thecvf.com/content_cvpr_2016/papers/He_Deep_Residual_Learning_CVPR_2016_paper.pdf). For example, use was made of the Faster R-CNN from the TensorFlow Object Detection API with a ResNet 101.

For the automatic assignment of classifications can also be achieved with the aid of an appropriately trained. Faster R-CNN algorithm.

As an alternative to Faster R-CNN, other deep learning multiobject detection algorithms, such as, for example, YOLO, YOLOv2, YOLOv3, Retina Net, SSD, R-FCN, Fast R-CNN and R-CNN, can be used.

In one example, the object found is automatically assigned to a stage and/or status only when the presence of an organism is considered reliable. For the assignment of a corresponding stage and/or status, a value for the validity of the classification can likewise be calculated and output.

In one example, a test data set of annotated images is used to determine the reliability of the analysis results realized by machine. An error rate, for example in the form of a confusion matrix, can be determined thereon.

The result of the corresponding analysis—position and classification of the organisms—is preferably stored in a database module and/or output in a well- and culture plate-specific manner.

Figure 5:
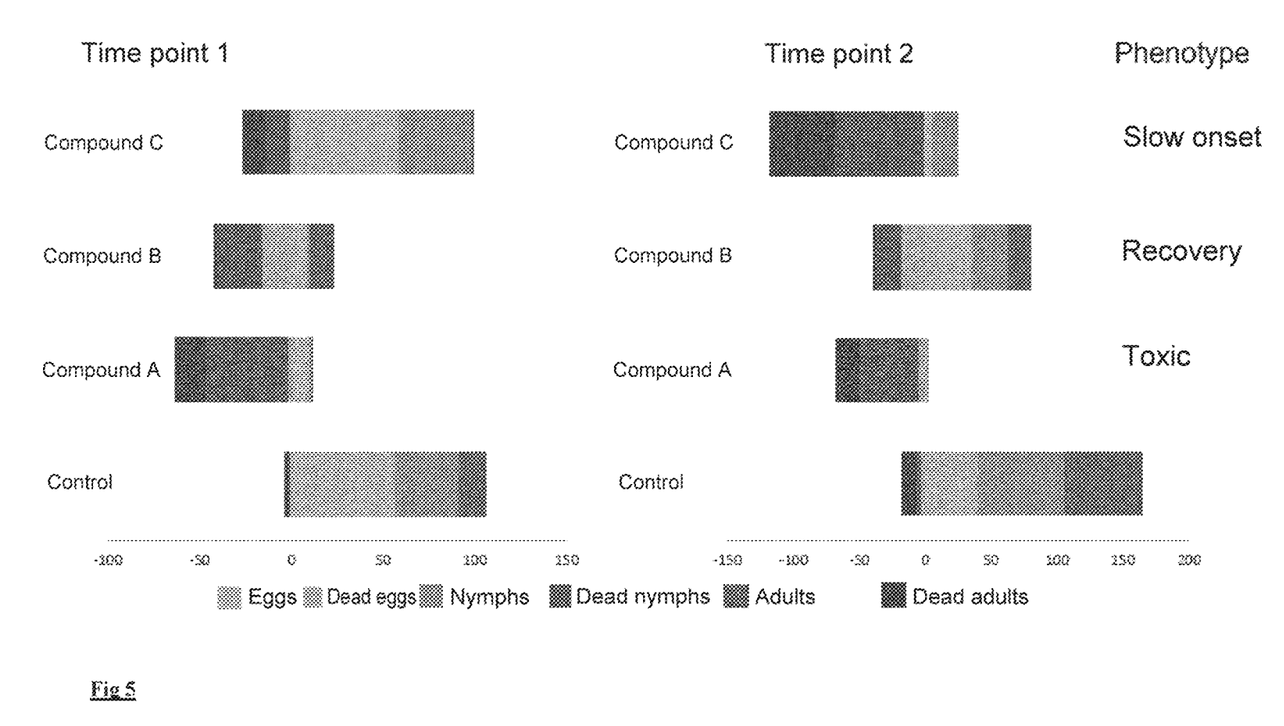
FIG. 5 shows examples of time series for phenotypes of the population.

In some embodiments of the method and for the visualization of results, the respective organisms are marked differently according to their categorization by stage/and status on the acquired image in accordance with predefined rules. For example, an organism in one stage is bordered by a frame having a defined shape and the status of the organism is made noticeable by means of coloring of the border. Text marking can also be used. The selection of the marking is as desired. One possible marking is depicted in FIG. 5.

From the calculated number of organisms by stage and/or status, it is possible to create time series for phenotypes of the populations (FIG. 6), i.e., a phenology of the organisms. Said phenology represents the multiplication of the organisms and the change in the phenotype thereof over time.

It should be noted that the method for image analysis can also be used for the analysis of images that were not provided using the method for image acquisition and processing, provided that said images are of appropriate quality.

The disclosure is described in detail hereinafter with reference to figures and examples, without wishing to restrict the disclosure to the features or combinations of features described and shown.

BRIEF DESCRIPTION OF THE FIGURES

The exemplary embodiments depicted in the figures shall be used to elucidate the disclosure more particularly. In the figures.

DETAILED DESCRIPTION

Figure 3:
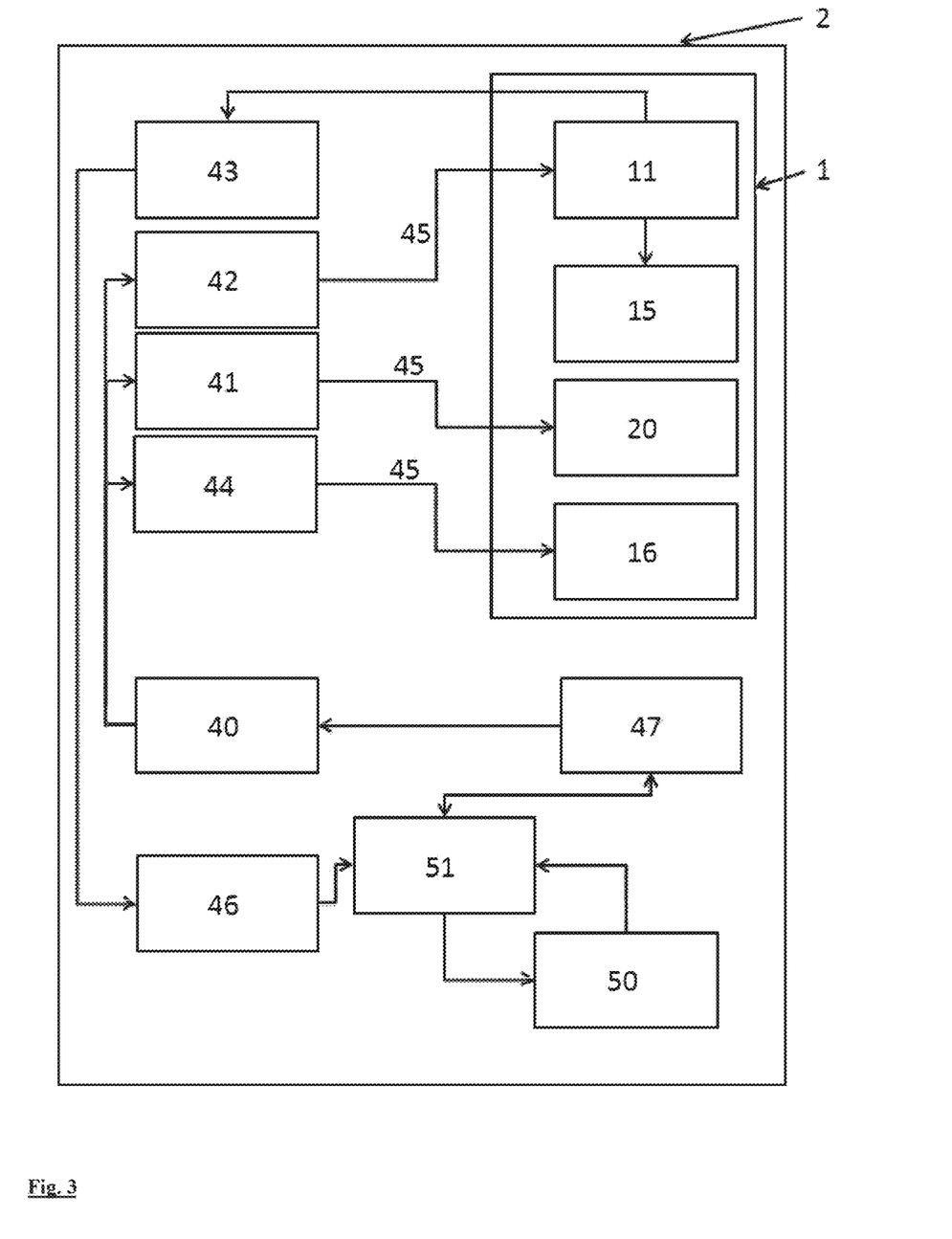
FIG. 3 shows a system diagram.
Figure 4:
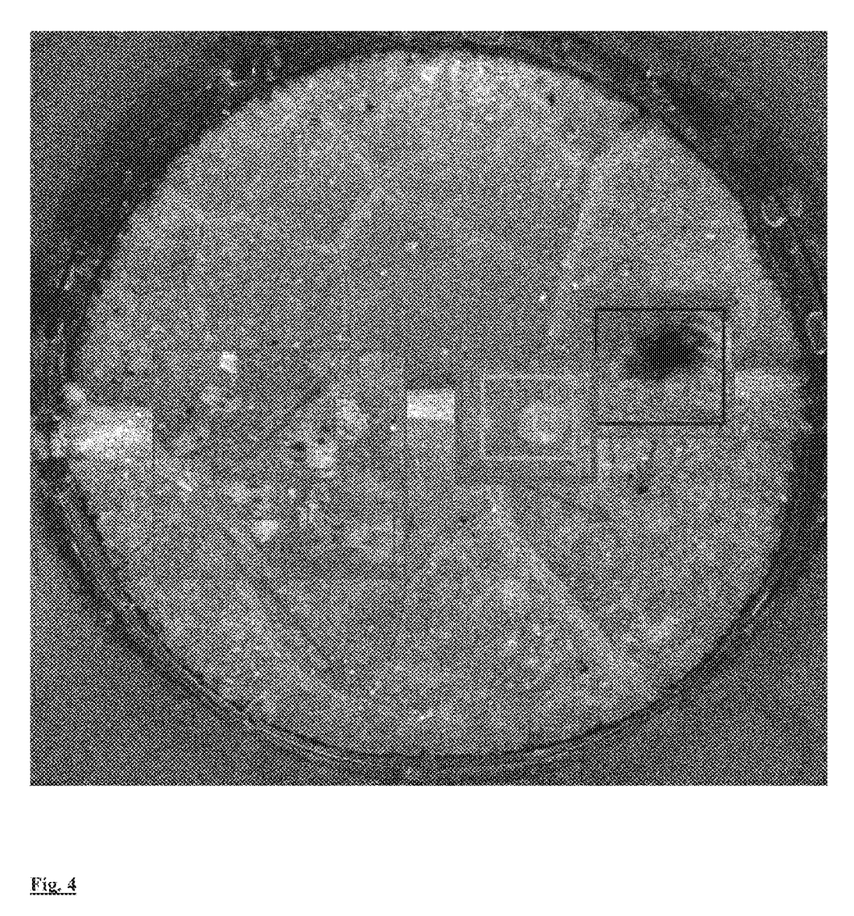
FIG. 4 show examples of an image with labeling of the organisms and the properties thereof.

FIG. 2 shows schematically in cross section an apparatus for the apparatus for acquiring macroscopic images. The apparatus 1 has a housing 10 in which a camera 11 having a lens 13 consisting of lens 13 and intermediate rings 14 is arranged. Furthermore, a cross table for positioning a well 31 of a cell culture plate 30 is provided in the housing 10. The apparatus has a device for coaxial illumination 15 of the cell culture plate 30, which is known from the prior art and is accordingly not depicted in more detail. The apparatus 10 makes it possible to create, using the camera 11, a plurality of chronologically successive digital images of a well 31 with a predefined change in the focal position, the images being acquired from the top side 33 of the well. Accordingly, the camera 11 is arranged above the well 31. To change the focal position, the apparatus 1 has a device for moving the camera 20 that comprises a camera mount 22, a z-axis 23 and a motor for moving the camera 21 along the z-axis. The camera 11 can move continuously and record the well 31 at predefined distances. Alternatively, the camera 11 can stop for recording and move on. FIG. 3 shows, in a diagram of the system according to the disclosure, which components allow the automation of image acquisition, image processing and image analysis. Image acquisition is carried out by a focal plane module 41 and by an image acquisition module 42 in accordance with a predefined sequence. A series of pictures is acquired automatically. At the end of the acquisition of a series of images, the next well 31 is placed under the camera 11 with the aid of the cross table 16 and a new series of images is acquired. To control the cross table 16, the system has a well positioning module 44. The sequence of image acquisition for one or more wells is specified by a process module 40 which is configured for acquisition of images using a method. From a series of images, an image processing module 46 generates with the aid of the focus stacking method one image that is in focus everywhere. Said image is provided to the image analysis module 50. Said module analyzes the image. The result of this analysis is stored in a database module 51 together with the image and displayed via a user interface 47.

The invention claimed is:

1. A system for determining the effect of active ingredients on living organisms accommodated on a support comprising a leaf in at least one well, comprising:
   an assay plate with the at least one well, wherein the at least one well contains the living organisms accommodated on the support comprising the leaf and an active ingredient applied to the living organisms;
   an apparatus for acquiring images of the at least one well comprising the living organisms and the active ingredient accommodated on the support, the apparatus comprising:
      a camera having an optical system, wherein the camera is arranged over the at least one well and is configured to acquire multiple images of a scene in which the at least one well is present, said multiple images being acquired at different focal planes, wherein the camera comprises a sensor which allows a 1:1 imaging scale or greater of the at least one well;
      a device for changing the focal plane;
      a device for illuminating the at least one well with at least one light source, wherein the device for illumination illuminates the at least one well homogeneously from above; and
   a control device configured to:
      control the apparatus for acquiring images such that a series of images for each well having a differing focal plane is acquired according to a predefined sequence;
      adjust and operate the device for changing the focal plane;
      operate the camera; and
      store one or more of the images or the series of images,
   wherein the control device is connected to the camera via interfaces; and
   wherein the system is configured for:
      object recognition with respect to the living organisms on the image and automatic classification of the living organisms based on the object recognized with the aid of a neural network trained with annotated images comprising classified living organisms, wherein the classified living organisms of the annotated images are assigned a stage comprising adult, larvae, or egg;

processing the images at different focal planes using a focus stacking method into an image of the at least one well of increased depth of field; and conducting the object recognition and classification with respect to the living organisms on the image of the at least one well of increased depth of field to determine the effect of the active ingredient applied to the living organisms, wherein the classification is configured to selectively determine the stage of the living organisms as adults, to selectively determine the stage of the living organisms as larvae, and to selectively determine the stage of the living organisms as eggs.

2. The system of claim 1, wherein classification in at least one of the following class lists is effected:
living or dead.

3. The system of claim 2, wherein the device for illuminating the well is a device for coaxial illumination.

4. The system of claim 2, wherein the optical system consists of a fixed-focus lens and one or more intermediate rings.

5. The system of claim 4, wherein the device for changing the focal plane is a device for moving the camera along the vertical axis (z).

6. The system of claim 2, wherein the system is further configured for processing of the series of images using the focus stacking method into an image that is in focus everywhere.

7. The system of claim 2, wherein the apparatus for acquiring macroscopic images comprises a device for positioning the wells that is movable horizontally in two directions (x, y).

8. The system of claim 7, wherein the system is further configured to carry out the following steps:
place a well in a predefined position in relation to the optical system by horizontally moving the cell culture plate with the aid of the device for positioning the wells; and
repeat placement for each well until all wells have been recorded.

9. A method for determining an effect of active ingredients on living organisms accommodated on a support comprising a leaf in at least one well in an assay plate, comprising:

a) placing the assay plate comprising the living organisms and an active ingredient applied to the living organisms accommodated on the support comprising the leaf, and positioning the at least one well in a predefined position in relation to a camera by horizontal movement of the assay plate with the aid of the device for positioning the at least one well, so that multiple images of a scene in which the at least one well comprising the living organisms and the active ingredient accommodated on the support are acquired;

b) setting a focal plane by operation of the device for changing the focal plane;

c) acquiring an image of the at least one well by the camera;

d) storing the image;

e) changing the focal plane by operation of the device for changing the focal plane, f) repeating steps c) to e) for acquisition of a predefined number of images at different focal planes; and g) repeating steps a) to f) for another well until images at different focal planes are acquired for all wells, wherein the images at different focal planes are processed using a focus stacking method into an image of the at least one well of increased depth of field; and h) conducting object recognition with respect to the living organisms on the image and automatic classification of the living organisms based on the object recognized with the aid of a neural network trained with annotated images comprising classified living organisms, wherein the classified living organisms of the annotated images are assigned a stage comprising adult, larvae, or egg, conducting the object recognition and classification with respect to the living organisms on the image of the at least one well of increased depth of field determines the effect of the active ingredient applied to the living organisms, and the classification is configured to selectively determine the stage of the living organisms as adults, to selectively determine the stage of the living organisms as larvae, and to selectively determine the stage of the living organisms as eggs.

\* \* \* \* \*